United States Patent
Kawai et al.

(10) Patent No.: US 8,511,490 B2
(45) Date of Patent: Aug. 20, 2013

(54) SLEWING STOP CONTROL APPARATUS AND METHOD FOR SLEWING TYPE WORKING MACHINE

(75) Inventors: Hiroaki Kawai, Kobe (JP); Akira Tsutsui, Kobe (JP); Koichi Shimomura, Akashi (JP)

(73) Assignees: Kobe Steel, Ltd., Kobe-shi (JP); Kobelco Cranes Co., Ltd., Tokyo (JP)

( * ) Notice: Subject to any disclaimer, the term of this patent is extended or adjusted under 35 U.S.C. 154(b) by 712 days.

(21) Appl. No.: 12/759,122

(22) Filed: Apr. 13, 2010

(65) Prior Publication Data
US 2010/0264106 A1   Oct. 21, 2010

(30) Foreign Application Priority Data
Apr. 17, 2009   (JP) .................. 2009-100657

(51) Int. Cl.
*B66C 23/08*   (2006.01)

(52) U.S. Cl.
USPC .................. 212/235; 212/245; 212/290

(58) Field of Classification Search
USPC .................. 212/290, 230, 231, 235, 245
See application file for complete search history.

(56) References Cited

U.S. PATENT DOCUMENTS

| | | | | |
|---|---|---|---|---|
| 5,062,266 A | * | 11/1991 | Yoshimatsu | 60/466 |
| 5,063,742 A | * | 11/1991 | Yoshimatsu | 60/466 |
| 5,160,056 A | | 11/1992 | Yoshimatsu et al. | |
| 5,272,877 A | * | 12/1993 | Fukushima et al. | 60/327 |
| 5,636,516 A | * | 6/1997 | Kon | 60/466 |
| 5,823,369 A | * | 10/1998 | Kuromoto | 212/273 |

FOREIGN PATENT DOCUMENTS

| | | |
|---|---|---|
| EP | 0 454 923 A1 | 11/1991 |
| JP | 61-45031 | 3/1986 |
| JP | 3-177299 | 8/1991 |
| JP | 4-64597 | 2/1992 |
| JP | 5-254784 | 10/1993 |
| JP | 10-157983 | 6/1998 |
| JP | 11-139770 | 5/1999 |

OTHER PUBLICATIONS

Office Action issued on Feb. 1, 2011, in Japanese Patent Application No. 2009-100657 (with English Translation).
U.S. Appl. No. 12/756,474, filed Apr. 8, 2010, Tsutsui, et al.

* cited by examiner

*Primary Examiner* — Emmanuel M Marcelo
(74) *Attorney, Agent, or Firm* — Oblon, Spivak, McClelland, Maier & Neustadt, L.L.P.

(57) ABSTRACT

A slewing stop control apparatus and method, capable of executing, while performing the control of determining the target slewing velocity based on a remaining slewing angle from the actual slewing motion position up to the slewing stop angular position, an automatic control of re-slewing the slewing structure having been stopped before the slewing stop angular position. The apparatus executes slewing angular velocity control for deciding the slewing braking start timing to stop the stewing structure at a slewing stop angular position in accordance with a predetermined slewing deceleration and the subsequent target slewing angular velocity, based on the remaining slewing angle of the slewing structure. When the slewing structure stops before the slewing stop angular position due to disturbance despite the foregoing control, the target slewing angular velocity is corrected to be increased for generating slewing torque to restart the slewing.

7 Claims, 9 Drawing Sheets

SLEWING STOP CONTROL APPARATUS AND METHOD FOR SLEWING TYPE WORKING MACHINE

BACKGROUND OF THE INVENTION

1. Field of the Invention

The present invention relates to a slewing stop control apparatus and method for automatically stopping a slewing structure in a slewing type working machine such as a crane at a predetermined slewing angular position.

2. Description of the Related Art

For a slewing type working machine having a slewing body, such as a crane, there is conventionally developed an apparatus and a method for automatically starting a braking of the slewing body when the slewing body is closed to a certain slewing angular position to safely stop it at a certain slewing angular position.

For example, in Japanese Unexamined Patent Application Publication No. 11-139770, there is described an apparatus, in a crane 2 having a boom 4 as shown in FIG. 10, for automatically stop the slewing of the boom 4. According to this apparatus, the slewing region of the boom 4 is partitioned into a slewing allowed area Aa shown as an open area in FIG. 10 and a no-slewing area Ap shown as a hatched area in FIG. 10, based on the working state (a slewing radius Rn, an overhanging stroke of a outrigger 6, a hoist load, etc.). In other words, there are set a pair of slewing stop angular positions θsr and θsl, which are bounds of the slewing allowed area Aa and the no-slewing area Ap, on right and left sides of the current angular position of the boom 4. The apparatus monitors a remaining slewing angle θr from the current angular position of the boom 4 up to the slewing stop angular position corresponding to the current slewing direction of the boom 4 (the right slewing stop angular position θsr in the example shown in FIG. 10). When the remaining slewing angle θr has been reduced to a certain slewing braking angle, the apparatus automatically begins braking slewing regardless the operation stroke of the stroke lever, and then control the braking so as to stop the boom 4 at the slewing stop angular position.

The slewing braking angle is an angle which is required for stopping the boom 4 at the slewing stop angular position by braking at a certain slewing angular acceleration (a certain slewing deceleration). After the beginning of the braking, an angular speed command (a target slewing angular speed) which is decreased as the boom 4 is closed to the slewing stop angular position is set to keep the target slewing angular acceleration, and a supply flow rate to a slewing hydraulic motor is adjusted. Specifically, there is gradually reduced an opening area of a control valve between the hydraulic motor and a hydraulic pump supplying hydraulic oil thereto.

However, this control apparatus can be prevented from accurately controlling, because of disturbance. The apparatus performs the computation for the slewing stopping control on the premise of no disturbance; therefore, if the slewing structure receives an external force (for example, a wind, or a grave force on the boom 4 when the crane is declined), the boom 4 will be stopped at a position before the expected slewing stop angular position, in spite of the above-mentioned braking control.

The thus stopped boom 4 must be moved again in the direction equal to the previous one, in order to reach the slewing stop angular position; however, in the above conventional control apparatus, any operation of the control lever cannot restart the boom 4. The control apparatus is so designed as to determine the slewing angular velocity command, namely the target slewing angular velocity, based on the remaining slewing angle between the current angular position of the slewing structure and the slewing stop angular position, and then set the opening area of the control valve so as to make the difference between the target slewing angular velocity and the actual slewing angular velocity 0 (zero); therefore, after the external force make the boom 4 be stopped before the slewing stop angular position, any operation of the control lever cannot give a slewing torque larger than the torque by the external force. That is because: the stop of the boom 4 means that the slewing torque given to the slewing structure for the target slewing angular velocity and the torque by the external force is balanced, and the target slewing angular velocity is determined based on the remaining slewing angle regardless the operation stroke of the control lever.

As to this, the above patent application publication discloses a automatic reset switch, which is provided in a cab and pushed to give the operation stroke of the control lever precedence over the angular position of the slewing structure so as to supply the hydraulic oil to the hydraulic motor by a flow rate corresponding to the operation stroke; however, the reset switch cannot allow sufficient safety to be easily ensured. The operation of the reset switch forces the target slewing angular angle to be determined, regardless the remaining slewing angle, only based on the operation stroke of the control lever, thus not allowing the safety to be ensured by automatic control. Accordingly, an excessive operation of the control lever might give the boom 4 an excessive speed to cross the slewing stop angular position (that is, to enter the no-slewing area).

SUMMARY OF THE INVENTION

It is an object of the invention to provide a slewing stop control apparatus and a method capable of determining a target slewing velocity based on a remaining slewing angle from an actual position of a slewing structure up to a slewing stop angular position and further performing an automatic control to restart the slewing structure unexpectedly stopped before the slewing stop angular position due to disturbance to safely move it to the slewing stop angular position.

The apparatus according to the invention is provided in a slewing type working machine having a slewing structure and a slewing motor for slewing the slewing structure to control the slewing stop of the slewing structure so as to stop the slewing structure at a predetermined slewing stop angular position. The apparatus comprises: a slewing detector which detects an actual slewing angular position and an actual slewing angular velocity of the slewing structure; a braking start timing decision portion which decides a braking start timing at which a braking of the slewing of the slewing structure should be started to stop the slewing structure at the slewing stop angular position by a pre-determined slewing deceleration, based on the actual slewing angular velocity of the slewing structure and a remaining slewing angle from the actual slewing angular position of the slewing structure up to the slewing stop angular position; a target slewing angular velocity determination portion which determines a target slewing angular velocity corresponding to the remaining slewing angle to generate the slewing deceleration; a slewing angular velocity adjusting portion which adjusts the slewing angular velocity to generate the target slewing angular velocity from the braking start timing; an operation member which is operated to restart the slewing of the slewing structure having been stopped at a position before the slewing stop angular position so as to move the slewing structure toward the slewing stop angular position; and a target slewing angular velocity correcting portion which corrects the target slewing angular velocity determined by the target slewing angular velocity determining portion, upon the operation of the operation member, so as to increase the target slewing angular velocity.

The invention provides also a slewing stop control method for controlling a stopping of a slewing of a slewing structure in a slewing type working machine, which has the slewing structure and a slewing motor for slewing the slewing structure, to stop it at a predetermined slewing stop angular position. The method comprises: detecting an actual slewing angular position and an actual slewing angular velocity of the slewing structure; deciding a braking start timing at which a braking of the slewing of the slewing structure should be started to stop the slewing structure at the slewing stop angular position by a pre-determined slewing deceleration, based on the actual slewing angular velocity and a remaining slewing angle from the actual slewing angular position up to the slewing stop angular position; determining a target slewing angular velocity corresponding to the remaining slewing angle to generate the slewing deceleration and adjusting the actual slewing angle velocity of the slewing structure, from the braking start timing; and correcting the target slewing angular velocity determined by the target slewing angular velocity determining portion so as to increase the target slewing angular velocity, when an operation member provided in the slewing type working machine is operated to restart the slewing of the slewing structure toward the slewing stop angular position after the slewing structure is stopped at a position before the slewing stop angular position.

DESCRIPTION OF THE PREFERRED EMBODIMENTS

There will be described preferred embodiments according to the invention, referring the drawings.

Figure 1:
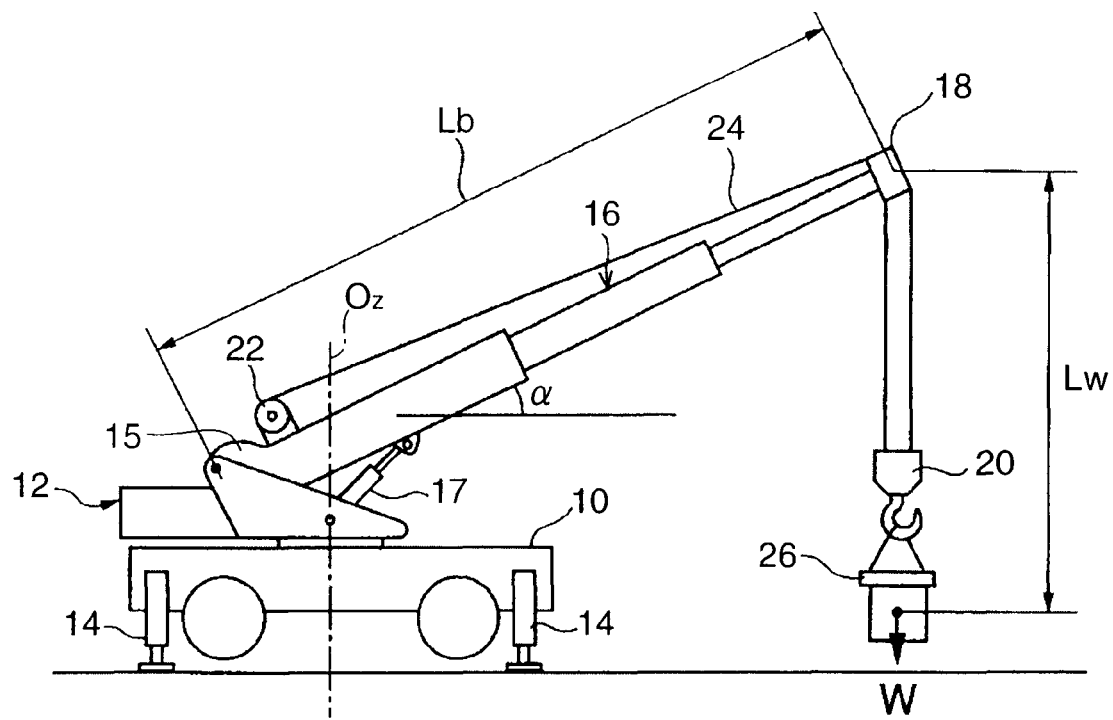
FIG. 1 is a front view schematically showing a crane as the slewing type working machine according to an embodiment of the present invention.

FIG. 1 shows a crane which is a slewing type working machine according to this embodiment. The crane comprises a base carrier 10 and an upper slewing structure 12 supported on the base carrier 10 so as to be able to slew around a vertical axis Oz. The base carrier 10 is provided with outriggers 14 capable of overhanging to right and left sides. The invention can be applied to any slewing type working machine comprising a slewing structure, for example, a hydraulic excavator having an upper slewing structure.

The upper slewing structure 12 includes a boom support member 15, a extendable boom 16, and a cylinder 17 for raising and falling the boom 16. The boom support member 15 is connected to the base carrier 10 via a slewing axis to support a basal end of the boom 16. The basal end of the boom 15 is connected to the boom support member 15 rotatably around a horizontal axis to enable the boom 16 to rise and fall.

The boom 16 has a free end 18, from which a hoisting attachment 20 is suspended. Specifically, the boom 16 supports a winch 22 on a back surface of the basal end thereof, and a rope 24 is dispensed from the winch 22 to be thread between the free end 18 and the hoisting attachment 20. The hoisting attachment 20 has a hook for hanging a hoist load 26.

Figure 2:
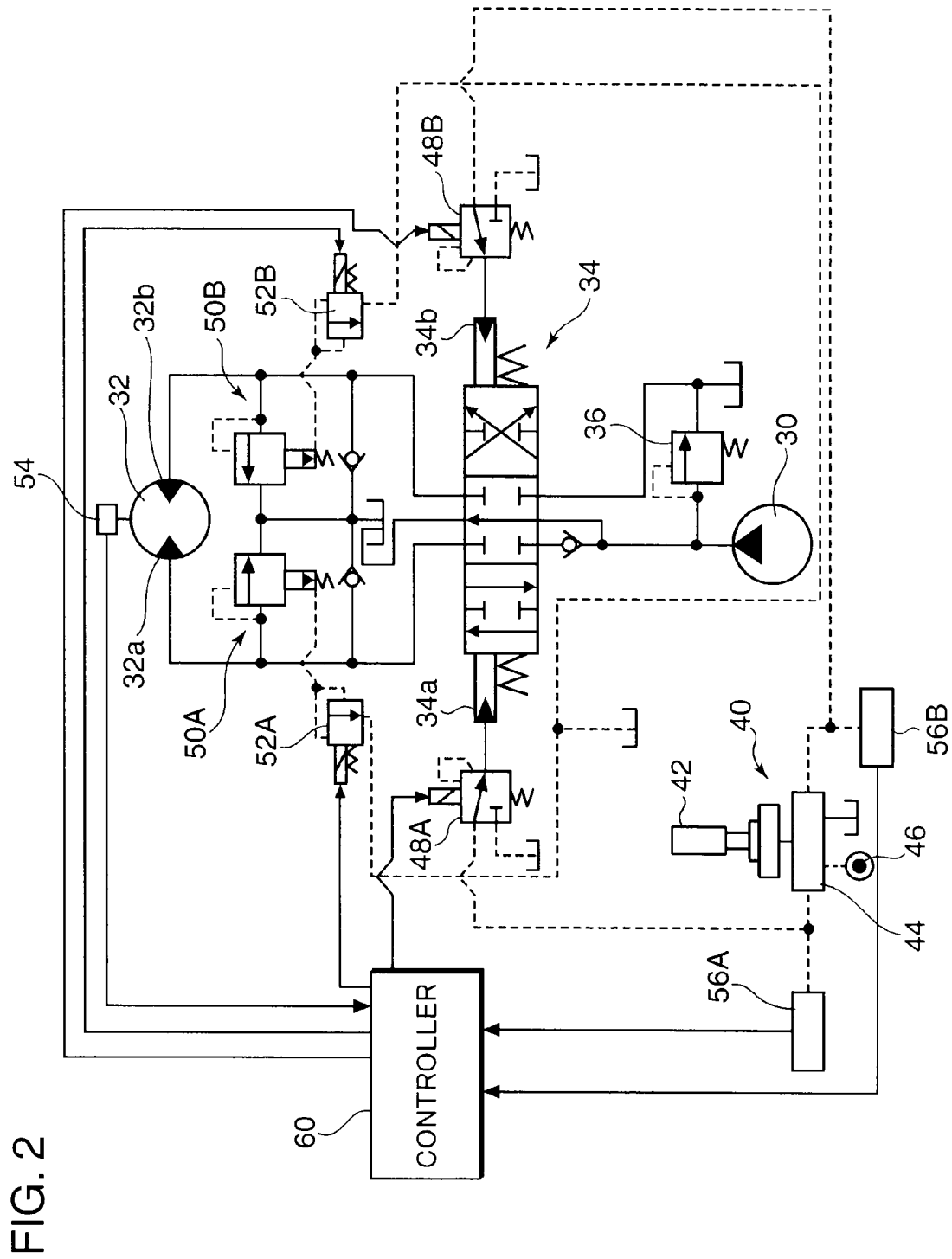
FIG. 2 is a diagram showing a slewing hydraulic motor to be mounted on the crane and a hydraulic circuit for driving the slewing hydraulic motor.

The base carrier 10 is provided with a hydraulic circuit for slewing the upper slewing structure 12, as shown FIG. 2. The hydraulic circuit has a hydraulic pump 30, a hydraulic slewing motor 32, and a control valve 34.

The hydraulic pump 30 discharges a hydraulic oil to supply it to the hydraulic slewing motor 32. The slewing motor 32 has an output shaft connected to the upper slewing structure 12 and a pair of ports 32a and 32b, to one of which the hydraulic oil is supplied to slew the upper slewing structure 12. Specifically, the flow of the hydraulic oil from one port to the other port in the hydraulic slewing motor 32 rotates the output shaft thereof, thus slewing the upper slewing structure 12 at an angular velocity corresponding to the flow rate of the hydraulic oil (motor flow rate) and in a direction corresponding to the flow direction of the hydraulic oil.

The control valve 34 is provided between the hydraulic pump 30 and the hydraulic slewing motor 32, serving as both of a directional selector valve for selecting a supply direction of the hydraulic oil from the hydraulic pump 30 to the hydraulic slewing motor 32 and a flow regulating valve for varying the flow rate of the hydraulic oil.

Specifically, the control valve 34 has a sleeve not shown and a spool slidably inserted into the sleeve. The spool is capable of being shifted between a neutral position shown as a center position and opposite supply positions shown as right and left positions. At the neutral position, the spool intercepts the path between the hydraulic pump 30 and the hydraulic slewing motor 32 while forming a hydraulic path for letting the hydraulic oil into a tank. At the left supply position (it will be described a "first supply position" below), the spool forms a hydraulic path for introducing the discharged oil from the hydraulic pump 30 into the port 32a of the hydraulic slewing motor 32 while letting the hydraulic oil discharged from the port 32b into the tank. On contract, at the right supply position (it will be described a "second supply position" below), the spool forms a hydraulic path for introducing the discharged oil from the hydraulic pump 30 into the port 32b of the hydraulic slewing motor 32 while letting the hydraulic oil discharged from the port 32a into the tank. The opening area of the path formed at each of the supply positions is increased with an increase in the sliding stroke of the spool.

The control valve 34 according to this embodiment is a pilot controlled selector valve. Specifically, the control valve 34 has a pair of pilot ports 34a and 34b, into each of which a pilot pressure is input. The first pilot pressure input to the pilot ports 34a shifts the control valve 34 from the neutral position to the first supply position by a stroke corresponding to the first pilot pressure; the second pilot pressure input to the pilot ports 34b shifts the control valve 34 from the neutral position to the second supply position by a stroke corresponding to the second pilot pressure.

The crane has a cab, which contains a operating device 40 for operating the control valve 34. The operating device 40 has a control lever (an operation member) 42 and a remote-control valve 44 connected to the control lever 42. The control lever 42 is installed in the cab and operated so as to fall down to right and left. The remote-control valve 44 is positioned between a pilot pump 46 for supplying the pilot pressure to the control valve 34 and the pilot ports 34a and 34b, outputting the pilot pressure corresponding to the operation stroke of the control lever 42 toward the pilot port corresponding to the operation direction of the control lever 42.

In this embodiment, there are provided pilot pressure control valves 48A and 48B configuring a valve operation unit between the remote control valve 44 and each of the pilot ports 34a and 34b respectively, that is, provided midway in the pilot lines. The pilot pressure control valves 48A and 48B are used to control the pilot pressure for braking the rotation of the slewing hydraulic motor 32 at a predetermined slewing deceleration regardless of the operation amount of the control lever 42 upon performing the slewing stop control described later. Each of the valves 48A and 48B is formed of a proportional electromagnetic pressure reducing valve having a solenoid. Specifically, each of the pilot pressure control valves 48A and 48B reduces the outlet pressure thereof to a pressure proportional to an electrical signal (pilot pressure command signal) input to the solenoid, regardless of a inlet hydraulic pressure input therein (namely, an outlet pressure of the remote control valve 44), and applying the pressure, as the pilot pressure, to the corresponding pilot port between the pilot ports 34a and 34b.

There are hydraulic pilot controlled adjustable relief valves 50A and 50B for setting the maximum of the pressure of the slewing hydraulic motor 32, which valves are connected to the lines between the respective ports 32a and 32b of the slewing hydraulic motor 32 and the control valve 34, respectively. Each of the respective adjustable relief valves 50A and 50B, which includes a pilot port for receiving the pilot pressure, is adapted to be opened when the inlet pressure of each of the adjustable relief valves 50A and 50B is greater than the pilot pressure (setting pressure), to let the hydraulic oil into the tank.

The adjustable relief valves 50A and 50B are connected to respective proportional electromagnetic relief valves 52A and 52B for changing the setting pressure thereof. The proportional electromagnetic relief valves 52A and 52B, each having a solenoid into which a command signal is input, are provided in respective pilot lines connecting the pilot ports of the adjustable relief valves 50A and 50B to the tank. Each of the valves 52A and 52B are adapted to be opened when the inlet pressure thereof, i.e., the pressure at the pilot port side, is greater than the pressure corresponding to the command signal, to let the pilot oil to the tank.

Figure 3:
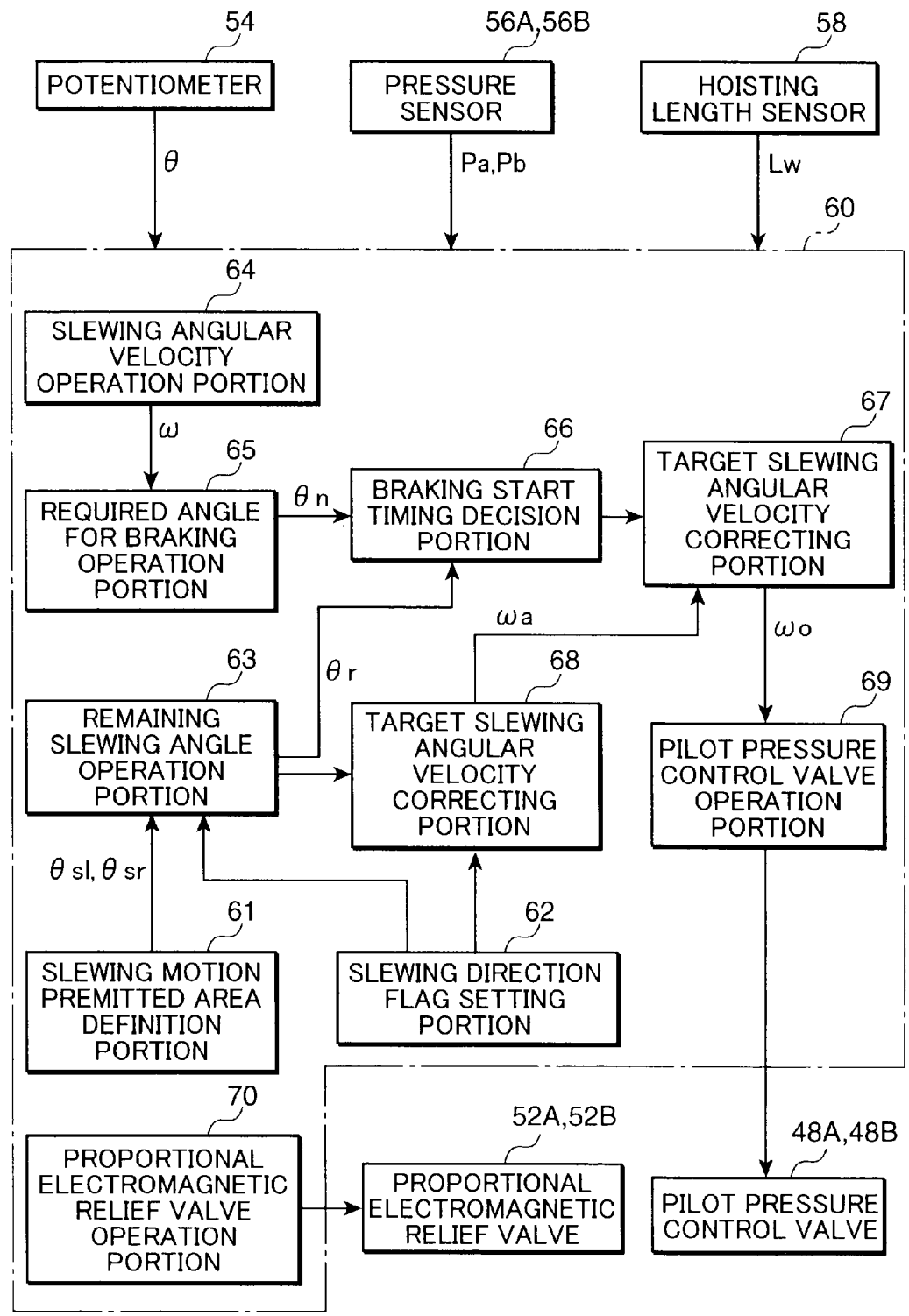
FIG. 3 is a block diagram showing the functions of the slewing stop control of a controller for controlling the drive of the slewing hydraulic motor.

This crane is equipped with various types of sensors. Specifically, provided for detecting the operation state of the boom 16 are a boom length sensor for detecting the boom length Lb as a sensor, a boom angle sensor for detecting the boom hoisting angle α of the boom 16, and a suspension weight sensor for detecting the weight W of the suspended load 26; and provided for contributing to the slewing stop control described later are a discharge flow rate sensor (not shown) for detecting the pump discharge flow rate Qp, a potentiometer 54 and a pair of pressure sensors 56A and 56B as shown in FIG. 2 and FIG. 3, a hoisting length sensor 58 shown in FIG. 3, and so on. The potentiometer 54 is connected to the output shaft of the slewing hydraulic motor 32 to output a detection signal corresponding to the rotating angular position of the output shaft, namely, the slewing angular position θ of the slewing upper structure 12. The pressure sensors 56A and 56B output respective detection signals corresponding to the hydraulic pressures output from the left and right output ports of the remote control valve 44, that is, the hydraulic pressures corresponding to the operation amount of the control lever 42. The hoisting length sensor 58 outputs a detection signal corresponding to the hoisting length Lw from the free end 18 of the boom 16 to the center of gravity of the suspended load 26.

The detection signal from each of the sensors is input into a controller 60 as shown in FIG. 2 and FIG. 3. The controller 60 is formed of a microcomputer or the like, and executes various types of electrical crane control including the above slewing stop control. The slewing stop control is for automatically stopping the boom 16 slewing within a slewing motion permitted area Aa at a slewing stop angular position which is the boundary angle between the area Aa and a slewing motion prohibited area Ap: the areas Aa and Ap, as shown in FIG. 10, is previously defined around the crane on the slewing motion of the slewing upper structure 12.

For this slewing stop control, the controller 60 includes the following functions shown in FIG. 3: a slewing motion permitted area definition portion 61, a slewing direction flag setting portion 62, a remaining slewing angle operation portion 63, a slewing angular velocity operation portion 64, a required angle for braking operation portion 65, a braking start timing decision portion 66, a target slewing angular velocity operation portion 67, a target slewing angular velocity correction portion 68, a pilot pressure control valve operation portion 69, and a proportional electromagnetic relief valve operation portion 70.

Figure 10:
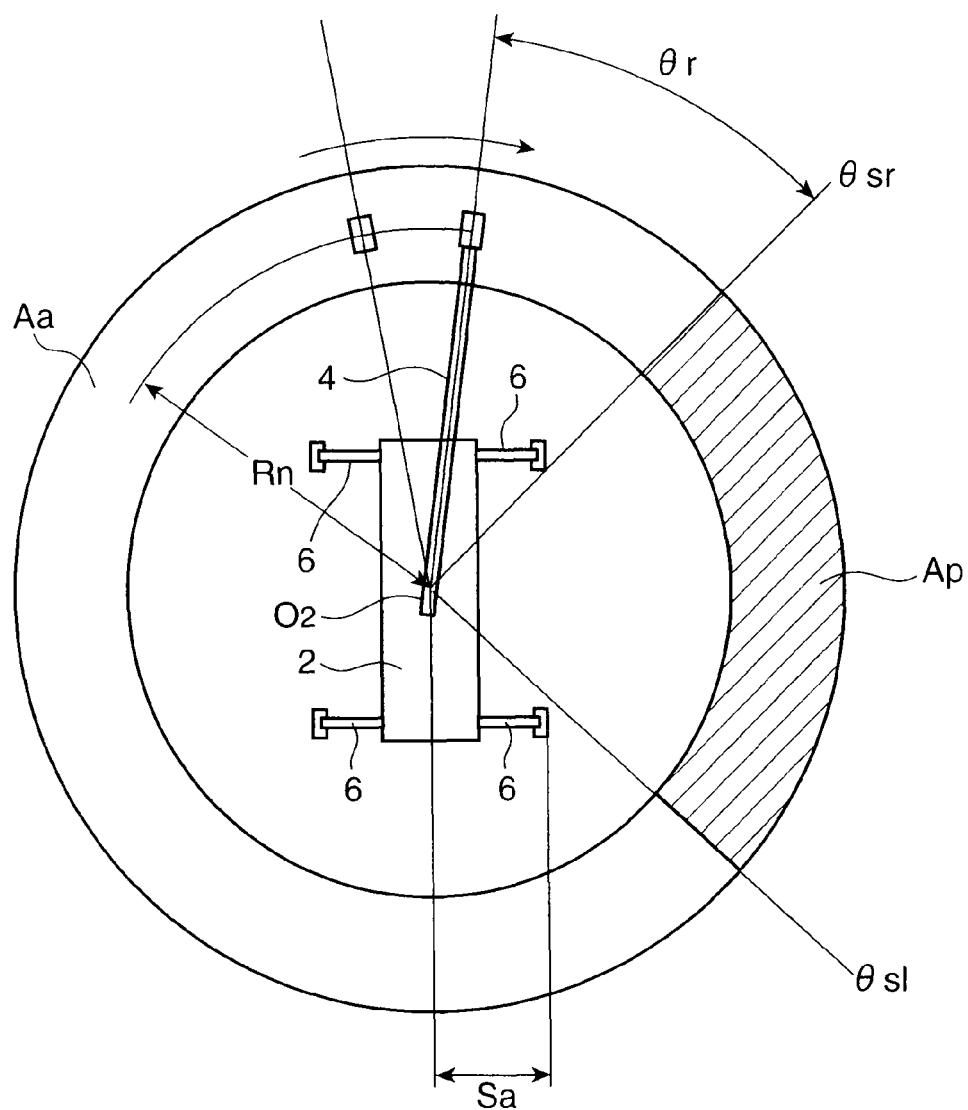
FIG. 10 is a plan view showing an example of the slewing motion permitted area and the slewing motion prohibited area which are set around a crane.

The slewing motion permitted area definition portion 61 defines the slewing motion permitted area Aa shown in FIG. 10 and the other area, slewing motion prohibited area Ap, regarding the slewing angular area of the slewing upper structure 12. This definition is based on the operational state of the boom 16; specifically, the slewing radius Rn (FIG. 10) calculated from the boom length Lb and the boom hoisting angle α shown in FIG. 1, suspension load W, outrigger hanging stroke Sa (FIG. 10), and the presence/absence of obstacles around the crane. Simultaneously with the definition of the areas Aa and Ap are also set slewing stop angular positions $\theta_{sl}$ and $\theta_{sr}$ (that is, respective angular positions corresponding to the boundary angles of the areas Aa and Ap) at which the boom 16 must be stopped in relation to the left and right slewing directions of the boom 16.

The slewing direction flag setting portion 62 determines the slewing direction corresponding to the operating direction of the control lever 42, based on the output signal from the pressure sensors 56A and 56B detecting the respective outlet pressures of the remote control valve 44 to turn the left and right slewing motion flags ON/OFF respectively. Specifically, it turns the left slewing motion flag ON and turns the right slewing motion flag OFF upon the left direction operation of the control lever 42; it turns the right slewing motion flag ON and turns the left slewing motion flag OFF upon the right direction operation thereof; and it turns both of the left and right slewing motion flags OFF upon essentially no operation of the control lever 42 (specifically, when the control lever 42 is positioned at its neutral position or operated in such a trace stroke that the control lever 42 can be deemed to be at the neutral position).

The remaining slewing angle operation portion 63 performs an operation on (that is, calculates) the remaining slewing angle θr which is the angle from the actual slewing angular position θ detected by the potentiometer 54 to the slewing angular stop position $θ_{sl}$ or $θ_{sr}$ downstream in the slewing direction (that is, the slewing angular stop position on the side at which the slewing motion flag is ON).

The slewing angular velocity operation portion 64 performs an operation on the slewing angular velocity ω which is the time rate of change of the slewing angular position θ detected by the potentiometer 54. This means that the slewing angular velocity operation portion 64 constitutes, together with the potentiometer 54, the "slewing detector" of the slewing stop control apparatus according to the present invention.

The required angle for braking operation portion 65 determines the slewing deceleration β0 of the slewing upper structure 12 by which the slewing stop control should be performed, and performs an operation of a required angle for braking θn which is the angle required for braking and stopping the slewing upper structure 12 so as to reduce the slewing angular velocity, from the current slewing angular velocity ω, at the slewing deceleration β. In this embodiment, selected as the slewing deceleration β is the angular acceleration having the largest absolute value among the (negative) slewing angular accelerations which allow the boom 16 to be stopped without leaving any swing of the suspended load 26 in the slewing direction and satisfy the strength requirements based on the lateral bending strength and the like of the boom 16.

The braking start timing decision portion 66 decides the appropriate braking start timing, that is, the timing at which the braking must be started in order to brake the slewing of the slewing upper structure 12 at the slewing deceleration β and stop it at the slewing stop angular position. This decision is made based on the comparison of the remaining slewing angle θr calculated by the remaining slewing angle operation portion 63 and the required angle for braking θn calculated by the required angle for braking operation portion 65.

The target slewing angular velocity operation portion 67 performs a momentary operation on the target slewing angular velocity ωo for keeping the slewing deceleration β in correspondence with the remaining slewing angle θr decreased in time, for performance of the braking. In this embodiment, where the slewing motion deceleration β is constant regardless of the remaining slewing angle θr, the calculated target slewing angular velocity ωo is decreased proportionally to the decrease in the remaining slewing angle θr.

The target slewing angular velocity correction operation portion 68, which is one of the features of the present invention, performs the following functions.

1) Upon the stop of the slewing upper structure 12, the portion 68 distinguishes whether the current position thereof is the normal slewing angular stop position or a position before the slewing angular stop position. Specifically, it distinguishes whether the remaining slewing angle θr at the time when the slewing angular velocity ω calculated with the slewing angular velocity operation portion 64 has reduced to 0 or has left a positive number.

2) If it has been distinguished in 1) that the slewing upper structure 12 has stopped at a position before the slewing angular stop position and subsequently a predetermined restart operation for re-slewing the slewing upper structure 12 in the same direction has been performed, the portion 68 performs an operation on the correction amount ωa for making the re-slewing possible, and adds it to the target slewing angular velocity ωo not yet corrected to updates the target slewing angular velocity ωo. The "restart operation" will be explained in detail later.

When the remaining slewing angle θr has been reduced to 0 (that is, when the slewing upper structure 12 has reached the slewing angular stop position), the target slewing angular velocity operation portion 67 resets the target slewing angular velocity ωo to 0 regardless of the correction amount ωa.

The pilot pressure control valve operation portion 69, from the braking start timing, performs an operation on the spool stroke Xs of the control valve 34 required for generating the target slewing angular velocity ωo (including already corrected value) calculated by the target slewing angular velocity operation portion 67, and inputs the pilot pressure command signal for generating the spool stroke Xs into the solenoid of the adequate pilot pressure control valve 48A or 48B.

The proportional electromagnetic relief valve operation portion 70 performs an operation on the command signal to be input to the solenoid of each of the proportional electromagnetic relief valves 52A and 52B and input it. The details thereof will be described later.

Figure 4:
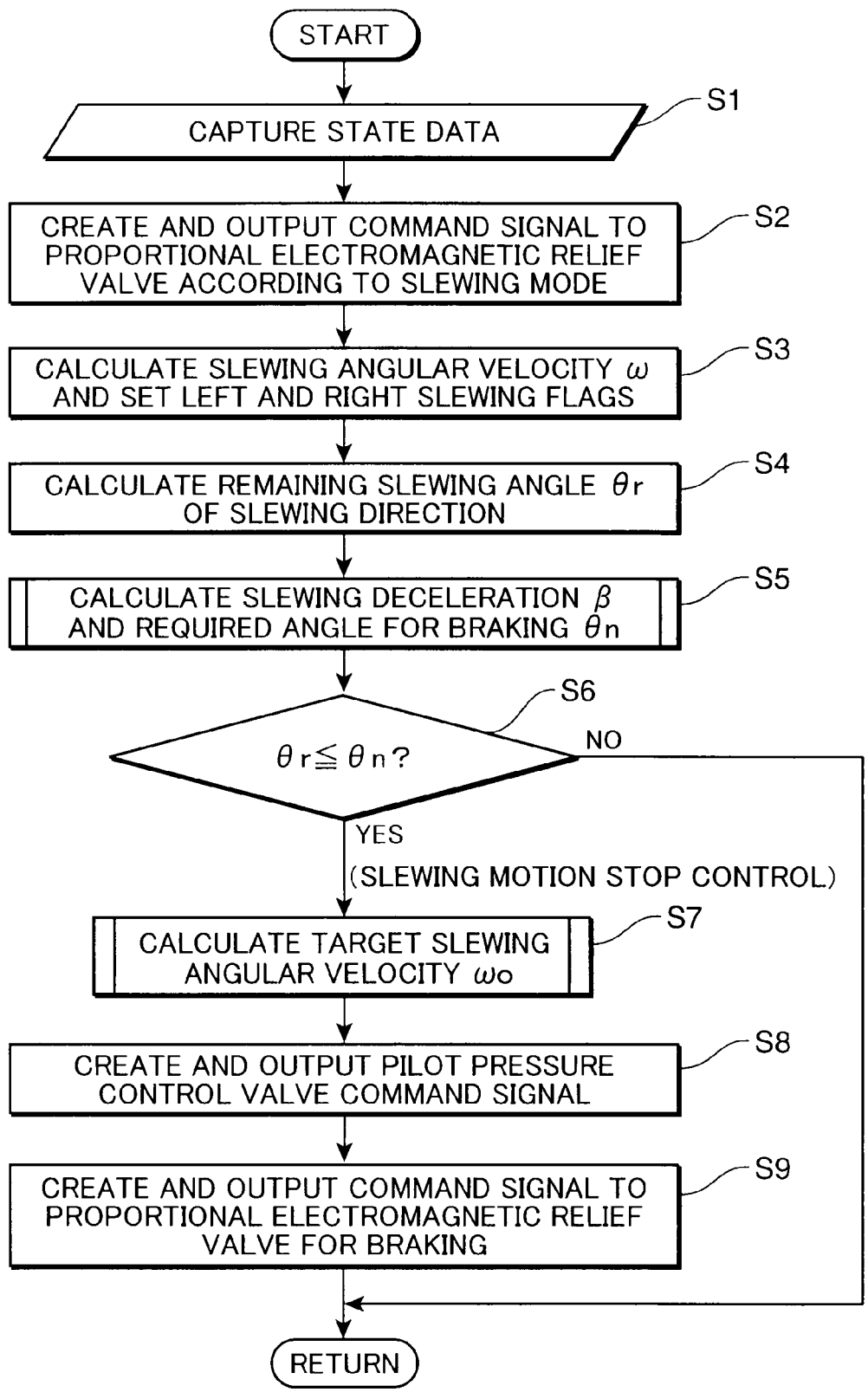
FIG. 4 is a flowchart showing the computation on the slewing stop control.
Figure 5:
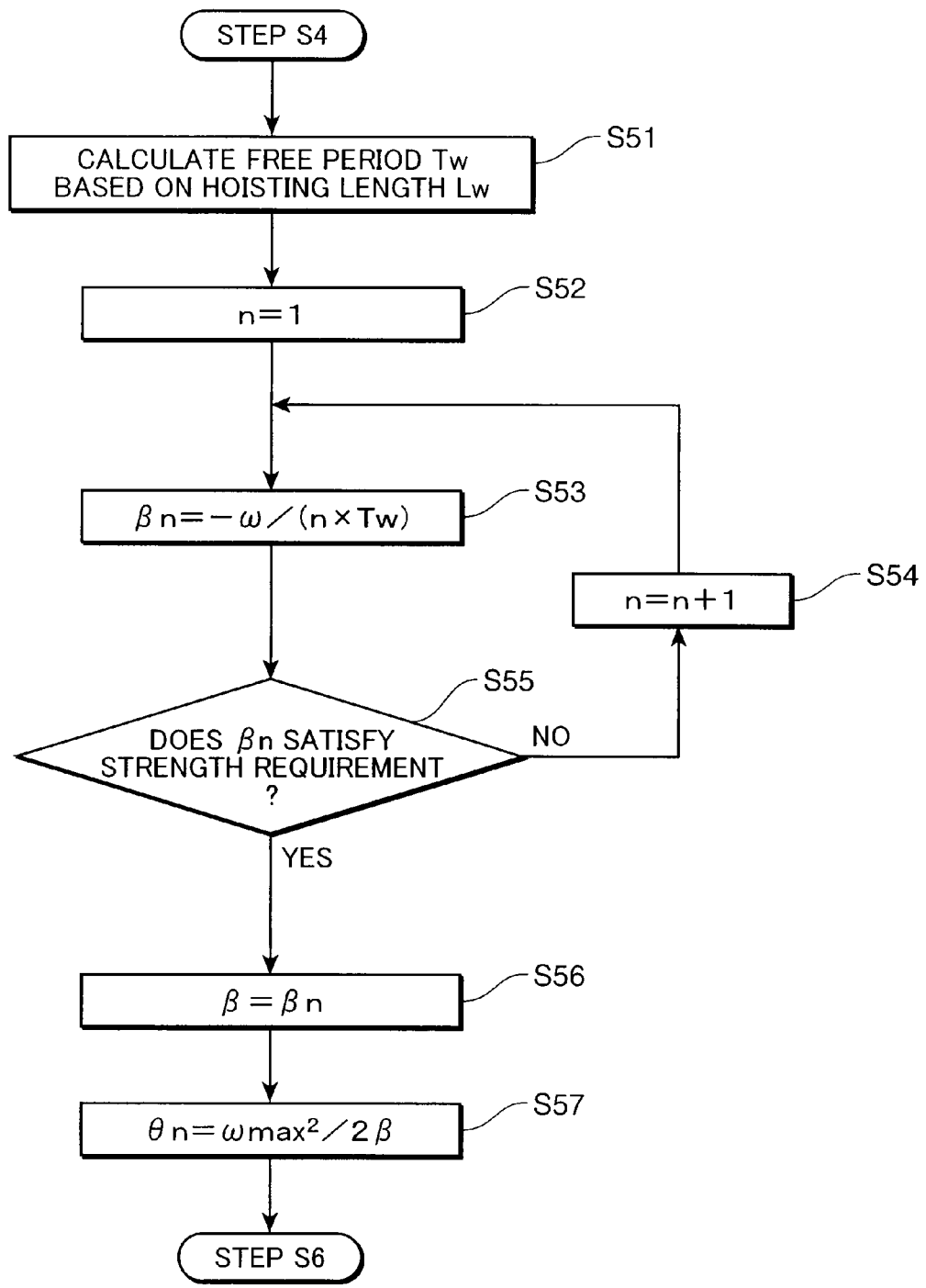
FIG. 5 is a flowchart showing the operation for calculating the slewing motion deceleration and the required angle for braking among the control actions.
Figure 6:
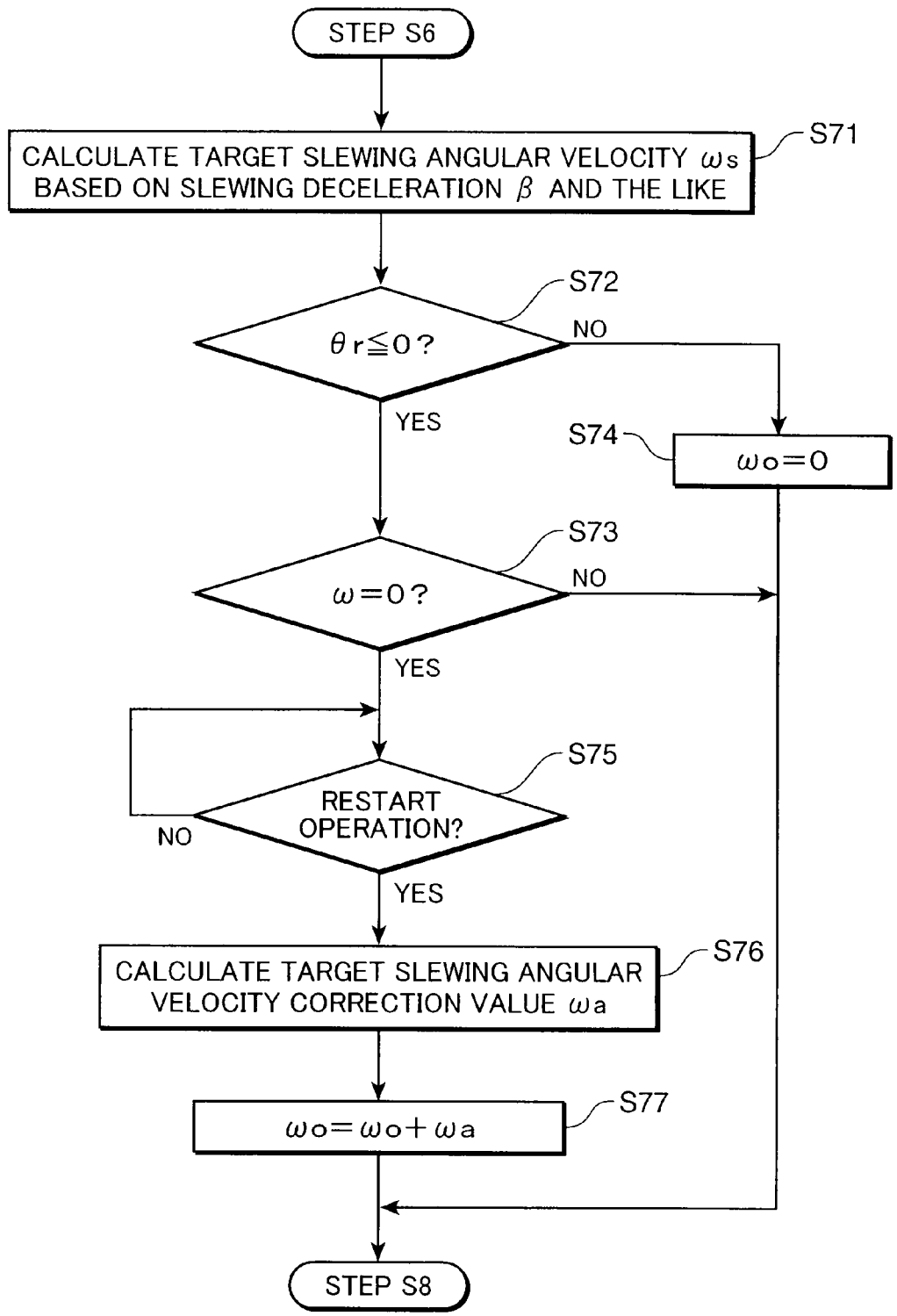
FIG. 6 is a flowchart showing the detailed operation for calculating the target slewing angular velocity among the control actions.

Next will be explained the specific slewing stop control operation performed by the controller 60, with reference to the flowcharts of FIG. 4 to FIG. 6. FIG. 4 shows the main routine of the slewing stop control, and FIG. 5 and FIG. 6 show the sub routine thereof.

1) Capture State Data (Step S1 in FIG. 4)

At first, the controller 60 captures the state data including, in addition to the detected amounts by the sensors, the left and right slewing angular stop positions $θ_{sl}$ and $θ_{sr}$ determined by the slewing motion permitted area definition portion 61. Besides, the various apparatus data (pump capacity, motor capacity, speed reduction ratio of the reducer, and so on) are previously input to the controller 60.

2) Creation and Output of a Command Signal for the Proportional Electromagnetic Relief Valves 52a and 52b According to the Slewing Mode (step S2 in FIG. 4)

The controller 60 identifies the designated slewing mode (free slewing mode or slewing lock mode), and computes to create the command signal to be input to the proportional electromagnetic relief valves 52A and 52B according to the slewing motion mode, and outputs the signal. Specifically, if the free slewing mode is designated, the controller 60 maximizes the command signal to be input to the meter-in side proportional electromagnetic relief valve, which is one of the proportional electromagnetic relief valves 52A and 52B, to close the valve, while minimizing the command signal to be input to the meter-out side proportional electromagnetic relief valve, which is the other valve, to open the valve. If the slewing lock mode is designated, the controller 60 maximizes the command signals to be input to both proportional electromagnetic relief valves 52A and 52B.

3) Setting of the Slewing Angular Velocity ω and the Left and Right Slewing Motion Flags (Step S3 in FIG. 4)

The controller 60 calculates the slewing angular velocity ω by the temporal differentiation of the slewing angular position θ detected by the potentiometer 54, and turns the left slewing motion flag and the right slewing motion flag ON/OFF respectively, according to the pressure detected by the pressure sensors 56A and 56B (that is, the outlet pressures of the remote control valve 44). Specifically, if the pressure Pa detected by the pressure sensor 56A is of a predetermined minimum operation pressure $P_{min}$ or higher, the left slewing motion flag is turned ON; if the pressure Pb detected by the pressure sensor 56B is not less than the minimum operation pressure $P_{min}$, the right slewing motion flag is turned ON; if both pressures Pa and Pb are less than the minimum operation pressure $P_{min}$, both the left and right slewing motion flags are turned OFF.

4) Calculation of Remaining Slewing Angle θr (Step S4 in FIG. 4)

To calculate the remaining slewing angle θr, there is determined a target slewing stop angular position which is the left or right slewing stop angular positions $θ_{sl}$ and $θ_{sr}$, based on the ON/OFF of the left and right slewing motion flags. Then, the angle from the current slewing angular position θ to the target slewing stop angular position is calculated as the remaining slewing angle θr. For example, in a right slewing motion as shown in FIG. 10, the right-side slewing stop angular position $θ_{sr}$ is selected because the right slewing motion flag is ON, and the difference between the slewing stop angular position $θ_{sr}$ and the actual slewing angular position θ is calculated as the remaining slewing angle θr.

5) Calculation of the Slewing Motion Deceleration β and Required Angle for Braking θn (Step S5 in FIG. 4)

The slewing deceleration β calculated here is, as described above, of the (negative) slewing angular acceleration which allows the boom 16 to be stopped without leaving any swing of the suspended load 26 in the slewing direction, satisfies the strength requirements based on the lateral bending strength and the like of the boom 16, and has the largest absolute value among the satisfying acceleration. For instance, it is specified according to the routine shown in FIG. 5.

Foremost, the free swing period Tw of the suspended load 26 is calculated based on the hoisting length Lw thereof detected by the hoisting length sensor 58 (step S51). On the premise of the free period Tw, there exist a plurality of swing modes in which the boom 16 can be stopped with no swing of the suspended load 26. The (negative) slewing angular acceleration corresponding to the modes are calculated in order from the one having the highest absolute value, and the one satisfying the strength requirements and calculated at first is finally selected as the slewing motion deceleration β.

Specifically, n which is the order of the swing mode is set to "1" (step S52), and the slewing angular acceleration 13n corresponding to this mode (slewing angular acceleration β1 at this stage) is calculated (step S53).

The slewing angular acceleration βn is given according to the following formula.

$$βn = -ω/(n \times Tw) [rad/s^2] \quad (1)$$

Subsequently, whether the calculated slewing angular acceleration βn satisfies the strength requirements is judged (step S54). If the strength requirements is not satisfied (NO at step S54), 1 is added to the order n of the mode (step S55), and the same calculation is performed for the next mode. As a result of repeating this kind of calculation, at the time when the slewing angular acceleration βn satisfying the strength requirements is obtained for the first time (YES at step S54), the firstly obtained slewing angular acceleration βn is selected as the slewing motion deceleration β (step S56).

Moreover, based on this slewing deceleration β, the required angle for braking θn that is required for decelerating the slewing upper structure 12 from the current slewing angular velocity ω to stop it is calculated according to the following formula (step S57).

$$θn = ω_{max}^2 / 2β \quad (2)$$

Wherein, $ω_{max}$ is the maximum value of the slewing angular velocity calculated from the current discharge flow rate Qp of the hydraulic pump 30, being represented with the following formula including Vp which is the capacity of the hydraulic pump 30 and Nm which is the slewing speed reduction ratio between the speed of the slewing hydraulic motor 32 and that of the slewing upper structure 12.

$$ω_{max} = Qp/(2π \times Vp \times Nm) \quad (3)$$

The calculation on the required angle for braking θn does not absolutely have to involve the maximum value $ω_{max}$ as the slewing angular velocity ω; however, the calculation by use of the maximum value contributes high safety of the slewing stop control.

6) Decision of Braking Start Timing (Step S6 in FIG. 4)

The controller 60 decides the braking start timing, which is a timing at which the braking should be started to stop the slewing upper structure 12 at the slewing stop angular position, based on the comparison of the remaining slewing angle θr with the required angle for braking θn. Specifically, the controller 60 monitors the remaining slewing angle θr and, when the angle has reduced to the required angle for braking θn (YES at step S6), starts the calculation on the target slewing angular velocity ωo for slewing stop control (step S7).

During the interval in which the remaining slewing angle θr is greater than the required angle for braking θn (NO at step S6), the controller 60 outputs no pilot pressure command signal to either of the pilot pressure control valves 48A and 48B. In short, no command of regulating at the pilot pressure control valves 48A and 48B is output. Accordingly, until the start of the slewing stop control, the spool stroke of the control valve 34 depends on the output pressure of the remote control valve 44, that is, the operation amount of the control lever 42.

7) Calculation of the Target Slewing Angular Velocity ωo (Step S7 in FIG. 4)

The controller 60 performs, from the braking start timing, a momentary operation on the target slewing angular velocity ωo for generating the slewing motion deceleration β, based on the remaining slewing angle θr at each time (step S71 in FIG. 6). Specifically, the slewing angular velocity ωo corresponding to the remaining slewing angle θr is given by the following formula.

$$ωo = \sqrt{X} \text{ wherein, } X = ω_{max}^2 - 2β(θn - θr) \quad (4)$$

Formula (4) is based on the following theory. Foremost, with respect to the slewing upper structure 12 decelerated at the slewing motion deceleration β, the following formula will materialize, wherein t is the elapsed time from the braking start timing.

$$θn - θr = ω_{max} \times t - β \times t^2/2 \quad (4a)$$

The elapsed time t is therefore given by the following formula.

$$t = [ω_{max} \pm \sqrt{X}]/β$$

$$\text{wherein, } X = ω_{max}^2 - 2β(θn - θr) \quad (4b)$$

On the other hand, the slewing angular velocity ωo which should be calculated is represented with:

$$ωo = ω_{max} - β \times t \quad (4c).$$

Accordingly, substituting Formula (4b) into Formula (4c) gives Formula (4).

The target slewing angular velocity ωo thus calculated based on the remaining slewing angle θr is used until the slewing upper structure 12 reaches the slewing angular stop position (that is, until the remaining slewing angle θr reaches 0; YES at step S72), or until the slewing upper structure 12 is stopped (NO at step S73).

8) Creation and Output of the Pilot Pressure Command Signal (Step S8 of FIG. 4)

The controller 60 creates the pilot pressure command signal for generating the target slewing angular velocity ωo, and outputs the signal to the solenoid of the control value, which is one of the pilot pressure control valves 48A and 48B, on the side corresponding to the slewing direction, thereby causing the control valve to perform a regulation corresponding to the command signal. The opening area of the flow path of the control valve 34 is thus adjusted to be an area for generating the target slewing angular velocity ωo, regardless of the actual operation amount of the control lever 42.

Figure 7:
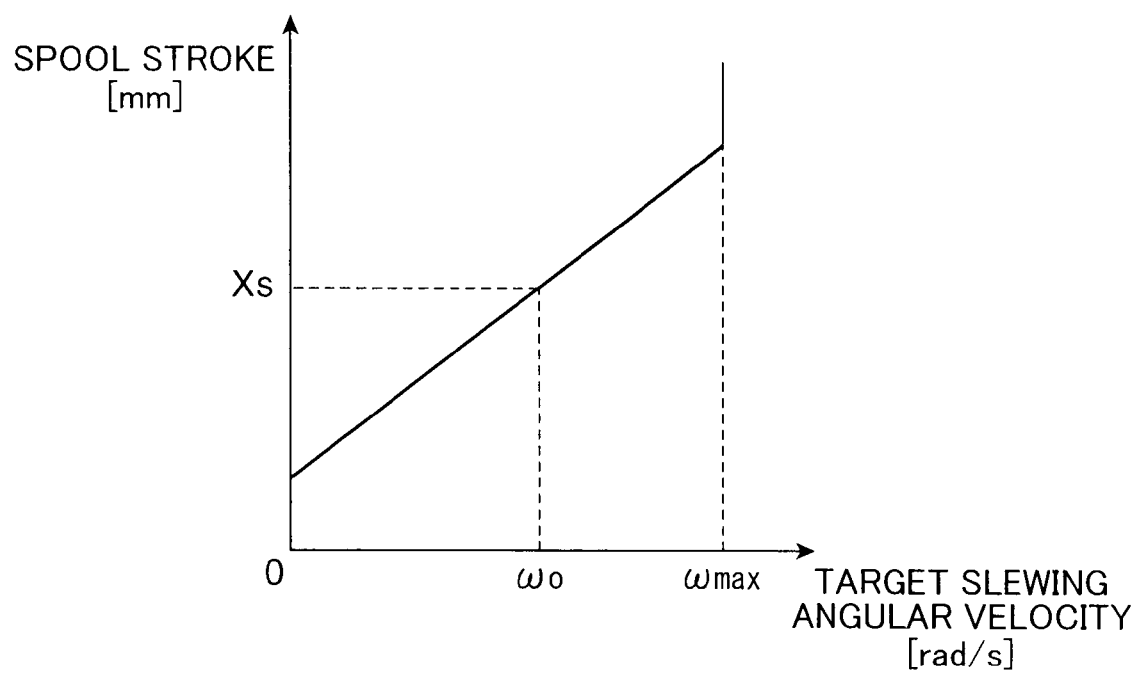
FIG. 7 is a graph showing the relation between the target slewing angular velocity and a spool stroke of the control valve for generating the target slewing angular velocity.

Specifically, the controller 60 calculates the spool stroke Xs of the control valve 34 for generating the target slewing angular velocity ωo, based on the previously given characteristics shown in FIG. 7, and outputs, to the pilot pressure control valve 48A (or 48B), a pilot pressure command signal for regulating the outlet pressure of the remote control value 44 to the pilot pressure corresponding to the spool stroke Xs.

Incidentally, when the slewing upper structure 12 has reached the slewing stop angular position; that is, when the remaining slewing angle θr has reduced to 0 (YES at step S72 in FIG. 6), the controller 60 resets the target slewing angular velocity ωo to 0 regardless of the other conditions (including the target slewing angular velocity correction described later), in order to reliably prevent the slewing upper structure 12 from entering the slewing motion prohibited area (step S74).

9) Creation and Output of a Command Signal for Braking to The Proportional Electromagnetic Relief Valves 52a and 52b (Step S9 of FIG. 4)

During the slewing braking, the controller 60 maximizes the command signals to be input to both proportional electromagnetic relief valves 52A and 52B regardless of the designated slewing mode (free slewing mode or slewing lock mode) to generates a hydraulic braking action.

10) Target Slewing Angular Velocity Correction for Restarting Slewing (Steps S75 to S77 in FIG. 6)

With no disturbance, the above-mentioned operation on the target slewing angular velocity ωo and the automatic actuation of the control valve 34 based thereon could make the slewing upper structure 12 stop at the slewing stop angular position quietly without leaving any swing of the suspended load 26. However, if suppressed by an external force acting thereon (for instance, wind or gravity acting on the slewing upper structure 12 in a inclined state), the slewing upper structure 12 will stop at a position before the slewing angular stop position, which is specifically a position where the slewing motion torque corresponding to the target slewing angular velocity ωo and the resistance torque of the external force are in balance. Thus stopped slewing upper structure 12 requires, to reach the slewing angular stop position, a re-slewing in the same direction as the previous one. However, in the slewing stop control mode, where the target slewing angular velocity ωo is independent of the operation amount of the control lever 42, the slewing upper structure 12 cannot restart however operated the control lever 42 is.

To solve the problem, the slewing stop control apparatus according to this embodiment has a feature that, if the rotation of the slewing upper structure 12 is stopped at a position before the slewing stop angular position, that is, a position where θr>0 (YES at steps S72 and S73), the apparatus corrects the target slewing angular velocity ωo to increase it, on the condition that the specified restart operation will be subsequently performed (YES at step S75). Specifically, the apparatus calculates a correction amount ωa to be added to the target slewing angular velocity ωo (step S76), and update the target slewing angular velocity to the new value to which the correction amount ωa has been added (step S77). The correction of thus increasing the target slewing angular velocity ωo enables the slewing upper structure 12 to be given a torque overcoming the resistance torque due to the disturbance while maintaining the slewing angular velocity control, thereby making it possible to restart the slewing upper structure 12 and safely stop it at the slewing stop angular position.

Herein, the term "restart operation" is an operation for a command to restart the slewing of the slewing upper structure 12 having been stopped at a position before reaching the slewing angular stop position toward the slewing angular stop position, the operation including anyone which can be distinguished from other standard slewing operations. For example, the operating room may contain a special switch only for slewing restarting within, the operation of which switch is deemed the restart operation.

This embodiment, however, involves the concurrent utilization of the control lever 42 as the operation member for the restart operation, which decreases the constituent elements of the apparatus: the controller 60 assumes an operation satisfying specified conditions on the control lever 42 to be the restart operation. The operations satisfying the specified conditions include, for example, an operation of once returning the control lever 42 to its neutral position and thereafter falling it to the same direction as the previous operating direction (that is, an operation not inverting the left and right slewing motion flags).

The target slewing angular velocity correction amount ωa, which may be a constant value, is preferably a correction amount including factors of the remaining slewing angle θr and the deviation Δω (=ω−ωo) of the slewing angular velocity. Specifically, preferable is a value calculated as follows.

Figure 8:
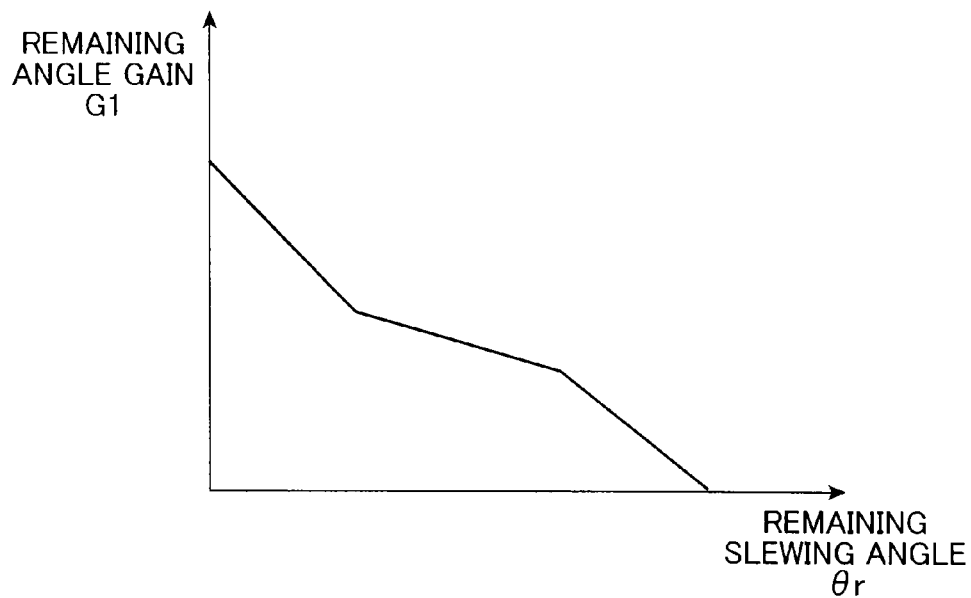
FIG. 8 is a graph showing the characteristics of the remaining slewing angle gain to be set for calculating the correction amount of the target slewing angular velocity.

Correction amount calculation example 1: In this example, the velocity deviation Δω or a velocity deviation parameter increased with an increase in the velocity deviation Δω is used as the basic correction amount Aw (Δω), and it is multiplied by the remaining angle gain G1 which is the remaining slewing angle parameter thereof (=G1×Aw (Δω), as the correction amount ωa. In this case, the smaller the remaining slewing angle θr (that is, the closer the slewing upper structure 12 to the slewing stop angular position), the smaller target slewing angular velocity ωo is determined; therefore, the velocity deviation Δω will also be small. For this reason, the remaining angle gain G1 by which the basic correction amount Aw (Δω) is multiplied is preferably given the characteristics of increasing by decrease in the remaining slewing angle θr as shown in FIG. 8. The combination of the basic correction amount Aw (Δω) and the remaining angle gain G1 ensure the slewing motion torque required for restarting the slewing upper structure 12 against static friction and so on in an area where the remaining slewing angle θr is small, that is, where the absolute value of the target slewing angular velocity ωo is originally small, while taking into account the deviation between the target slewing angular velocity ωo and the actual slewing angular velocity (0 at a once-stopped state) by use of the existence of the basic correction amount Aw (Δω), that is, the velocity deviation parameter.

Figure 9:
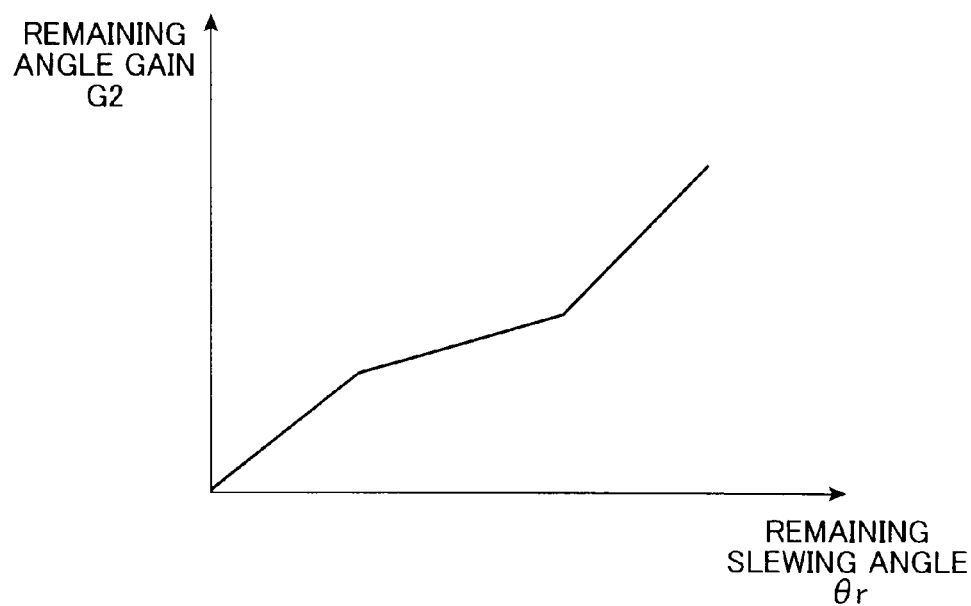
FIG. 9 is a graph showing another example of the characteristics of the remaining slewing angle gain to be set for calculating the correction amount of the target slewing angular velocity.

Correction amount calculation example 2: this example involves the time integration value (=∫Δω·dt) of the velocity deviation Δω or a velocity deviation integration parameter which increases by increase in the time integration value (=∫Δω·dt) as the basic correction amount Ai (Δω), which is multiplied by a remaining angle gain G2 (=G2×Ai(Δω) to be set to the correction amount ωa. In this calculation example, it is preferable that, contrary to the above remaining angle gain G1, the remaining angle gain G2 has a characteristics of being reduced (approaching 0) by the decrease in the remaining slewing angle θr as shown in FIG. 9. In this correction amount ωa (=G2×Ai(Δω)), the existence of the basic correction amount Ai as the velocity deviation integration parameter enables the correction for generating the slewing angular velocity in the vicinity of the target slewing angular velocity in spite of the existence of the disturbance torque to be made; while a relatively small remaining angle gain G2 is applied to a region where the remaining slewing angle θr is small, that is, where the degree of accumulation of the integration value is great, to prevent the correction amount ωa from becoming excessive.

Herein, the specific characteristics of the remaining angle gains G1 and G2 may be set appropriately in accordance with the operating characteristics (motor characteristics, slewing motion mechanism characteristics, characteristics depending on the specific structure of the boom, and so on) of the working machine mounted with the slewing stop control apparatus.

If the slewing upper structure 12 is restarted due to the correction of the target slewing angular velocity ωo but subsequently stops at another position before the slewing stop angular position once again (YES at step S63), the same correction may be performed once again.

As described above, the present invention provides a slewing stop control apparatus and method capable of executing, while performing the control of determining the target slewing velocity based on the remaining slewing angle from the actual slewing position of the slewing structure up to the slewing stop angular position, an automatic control of re-slewing the slewing structure to safely move the slewing structure to the slewing stop angular position without inconvenience even when the slewing structure erroneously stops at a position before the slewing stop angular position due to disturbance.

The apparatus according to the present invention is provided to a slewing type working machine including a slewing structure and a slewing motor for slewing the slewing structure, and controls a stop motion of the slewing structure to make the slewing structure be stopped at a predetermined slewing stop angular position. This apparatus comprises: a slewing detector which detects an actual slewing angular position and an actual slewing angular velocity of the slewing structure; a braking start timing decision portion which decides a braking start timing at which a braking of the slewing of the slewing structure should be started to stop the slewing structure at the slewing stop angular position by a pre-determined slewing deceleration, based on the actual slewing angular velocity of the slewing structure and a remaining slewing angle from the actual slewing angular position of the slewing structure up to the slewing stop angular position; a target slewing angular velocity determination portion which determines a target slewing angular velocity corresponding to the remaining slewing angle to generate the slewing deceleration; a slewing angular velocity adjusting portion which adjusts the slewing angular velocity to generate the target slewing angular velocity from the braking start timing; an operation member which is operated to restart the slewing of the slewing structure having been stopped at a position before the slewing stop angular position so as to move the slewing structure toward the slewing stop angular position; and a target slewing angular velocity correcting portion which corrects the target slewing angular velocity determined by the target slewing angular velocity determining portion so as to increase the target slewing angular velocity upon the operation of the operation member.

The present invention provides also a slewing stop control method for controlling a stop motion of a slewing of a slewing structure in a slewing type working machine including the slewing structure and a slewing motor for rotating the slewing structure to stop the slewing structure at a predetermined slewing stop angular position. This method includes the steps of: detecting an actual slewing angular position and an actual slewing angular velocity of the slewing structure; deciding a braking start timing at which a braking of the slewing of the slewing structure should be started to stop the slewing structure at the slewing stop angular position by a pre-determined slewing deceleration, based on the actual slewing angular velocity and a remaining slewing angle from the actual slewing angular position up to the slewing stop angular position; determining a target slewing angular velocity corresponding to the remaining slewing angle to generate the slewing deceleration and adjusting the actual slewing angle velocity of the slewing structure, from the braking start timing; and correcting the target slewing angular velocity determined corresponding to the remaining slewing angle so as to increase the target slewing angular velocity, when an operation member provided in the slewing type working machine is operated to restart the slewing of the slewing structure toward the slewing stop angular position after the slewing structure has been stopped at a position before the slewing stop angular position.

According to the apparatus and method, in addition that the slewing angular velocity control for stopping the slewing structure at a slewing stop angular position with a predetermined slewing motion deceleration is performed from a pre-determined braking start timing, if the slewing structure has been stopped before reaching the slewing stop angular position due to disturbance regardless of the angular velocity control, the slewing structure can be safely moved to the slewing stop angular position while maintaining the angular velocity control, specifically as follows.

Foremost, from the braking start timing, the target slewing angular velocity corresponding to the remaining slewing angle from the actual slewing angular position of the slewing structure to the slewing stop angular position, and the actual slewing angular velocity of the slewing structure is adjusted to generate the target slewing angular velocity. This makes the slewing structure be braked at a predetermined slewing deceleration. When an external force acts on the slewing structure in a direction to inhibit the slewing during the slewing motion braking, the slewing structure will stop at a slewing angular position at which the external force and the slewing motion torque applied to the slewing structure will be in balance, that is, a position before the slewing stop angular position.

In this occasion, the conventional slewing angular velocity control, which uniformly decides the target slewing angular velocity in correspondence with the remaining slewing angle regardless of the operation by the operator, cannot allow the slewing structure to be restarted without cancel of the slewing stop control mode; however, the apparatus and method according to the present invention, in which an operation for restarting the slewing structure in the same direction as the previous slewing direction allows the target slewing angular velocity to be corrected so as to be increased, can make the slewing motion torque exceed the torque of the external force, which enables the slewing structure to be restarted without cancel of the slewing angular velocity control. Moreover, this restart control, which is not based on the target slewing angular velocity decided according to the operation amount of the operation member as with the conventional control upon cancelling the automatic stop control but based on the target slewing angular velocity decided according to the remaining slewing angle as with the previous slewing stop control, allows the slewing structure, even after the above restart, to be safely and automatically moved to the slewing stop angular position.

The correction of the target slewing angular velocity is preferably performed by determining a correction amount to be added to the target slewing angular velocity determined based on the remaining slewing angle and adding the correction amount to the target slewing angular velocity. This correction, reliably maintaining the target slewing angular velocity determined based on the remaining slewing angle, ensure both of enabling the slewing structure to be restarted after the temporary stopping and performing a safe slewing stop control after the restart.

In this case, preferably calculated as the correction amount is a correction amount taking into account the remaining slewing angle, and a velocity deviation which is a difference between the target slewing angular velocity decided based on the remaining slewing angle and the actual slewing angular velocity. Suitable is, for example, a first correction amount including a velocity deviation parameter which is the velocity deviation itself or which increases by increase in the velocity deviation, and a remaining slewing angle parameter which increases by decrease in the remaining slewing angle; or a second correction amount including a velocity deviation integration parameter which is the integration value of the velocity deviation or which increases by increase in the integration value, and a remaining slewing angle parameter which decreases by decrease in the remaining slewing angle.

In the first correction amount, the velocity deviation parameter allows the deviation between the target slewing angular velocity and the actual slewing angular velocity (0 in a once-stopped state) to be taken into account, and a large remaining slewing angle parameter is applied in a region where the remaining slewing angle is small, that is, the region where the absolute value of the original target slewing angular velocity is small to ensure the slewing motion torque required for restarting the slewing structure against static friction force and so on. In the second correction amount, the velocity deviation integration parameter contributes the correction for generating a slewing angular velocity in the vicinity of the target slewing angular velocity in spite of the existence of the disturbance torque with, while a small remaining slewing angle parameter is applied in a region where the remaining slewing angle is small, that is, a region where the degree of accumulation of the integration value is great, to prevent the correction amount from becoming excessive.

It is more preferably that, when the remaining slewing angle has reduced to 0, that is, when the slewing structure reaches the slewing angular stop position, the target slewing angular velocity is forced to be set to 0 regardless of the correction amount.

The operation member may be special one provided only for the restart operation; however, may be also used a standard operation member, that is, a member operated for designating the slewing direction and target slewing angular velocity of the slewing structure when the slewing stop control of the slewing structure is not being performed concurrently for the restart operation. This concurrent use allows the apparatus to be simple. The concurrent use can be realized, for example, by assuming an operation satisfying predetermined conditions performed on the operation member after the temporary stop of the slewing structure at a position before the slewing stop angular position the operation to be an operation for restarting the rotation of the slewing structure toward the slewing stop angular position.

The apparatus according to this invention is not limited to either of the specific configuration of the slewing motor and the specific means for adjusting the slewing angular velocity with the slewing motor. For example, in the case where the slewing motor is a slewing hydraulic motor actuated by a supply of hydraulic fluid from a hydraulic power source to slew the slewing structure at an angular velocity corresponding to a supply flow rate of the hydraulic fluid, the slewing angular velocity adjustment portion is suitable if including a control valve which forms a hydraulic path between the slewing hydraulic motor and the hydraulic power source and is capable of being opened and closed so as to change a flow area of the hydraulic path, and a valve operation portion which opens and closes the control valve so as to generate the target slewing angular velocity determined by the target slewing angular velocity determination portion.

This application is based on Japanese patent application serial no. 2009-100657, filed in Japan Patent Office on Apr. 17, 2009, the contents of which are hereby incorporated by reference.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. A slewing stop control apparatus which is provided to a slewing type working machine including a slewing structure and a slewing motor for rotating the slewing structure to control a stop motion of a slewing of the slewing structure so as to stop the slewing structure at a predetermined slewing stop angular position, the slewing stop control apparatus comprising:
a slewing motion detector which detects an actual slewing angular position and an actual slewing angular velocity of the slewing structure;
a braking start timing decision portion which decides a braking start timing at which a braking of the slewing of the slewing structure should be started to stop the slewing structure at the slewing stop angular position at a pre-determined slewing deceleration, based on the actual slewing angular velocity of the slewing structure and a remaining slewing angle from the actual slewing angular position of the slewing structure up to the slewing stop angular position;
a target slewing angular velocity determination portion which determines a target slewing angular velocity corresponding to the remaining slewing angle to generate the slewing deceleration;
a slewing angular velocity adjusting portion which adjusts the slewing angular velocity to generate the target slewing angular velocity from the braking start timing;
an operation member which is operated to restart the slewing of the slewing structure having been stopped at a position before the slewing stop angular position so as to move the slewing structure toward the slewing stop angular position; and
a target slewing angular velocity correcting portion which corrects the target slewing angular velocity determined by the target slewing angular velocity determining portion, upon the operation of the operation member, so as to increase the target slewing angular velocity, wherein the target slewing angular velocity correction portion performs the correction by determining a correction amount to be added to the target slewing angular velocity determined based on the remaining slewing angle and adding the correction amount to the target slewing angular velocity.

2. The slewing stop control apparatus of a slewing type working machine according to claim 1, wherein the target slewing angular velocity correction portion calculates a correction amount of the target slewing angular velocity, the correction amount taking into account the remaining slewing angle and a velocity deviation which is a difference between the target slewing angular velocity determined based on the remaining slewing angle and the actual slewing angular velocity.

3. The slewing stop control apparatus of a slewing type working machine according to claim 1, wherein the operation member is operated to designate a slewing direction and a target slewing angular velocity of the slewing structure when the slewing stop control of the slewing structure is not performed; and the target slewing angular velocity correction portion assumes an operation satisfying a predetermined condition and performed on the operation member after a temporary stop of the slewing structure at a position before the slewing stop angular position to be an operation for restarting the rotation of the slewing structure toward the slewing stop angular position.

4. The slewing stop control apparatus of a slewing type working machine according to claim 1, wherein the slewing motor is a slewing hydraulic motor actuated by a supply of hydraulic fluid from a hydraulic power source to slew the slewing structure at an angular velocity corresponding to a supply flow rate of the hydraulic fluid; and the slewing angular velocity adjustment portion includes a control valve which forms a hydraulic path between the slewing hydraulic motor and the hydraulic power source and is capable of being opened and closed so as to change a flow area of the hydraulic path, and a valve operation portion which opens and closes the control valve so as to generate the target slewing angular velocity determined by the target slewing angular velocity determination portion.

5. A slewing stop control method for controlling a stop motion of a slewing of a slewing structure in a slewing type working machine including the slewing structure and a slewing motor for rotating the slewing structure to stop the slewing structure at a predetermined slewing stop angular position, the method comprising the steps of:
detecting an actual slewing angular position and an actual slewing angular velocity of the slewing structure;
deciding a braking start timing at which a braking of the slewing of the slewing structure should be started to stop the slewing structure at the slewing stop angular position by a pre-determined slewing deceleration, based on the actual slewing angular velocity and a remaining slewing angle from the actual slewing angular position up to the slewing stop angular position;

determining a target slewing angular velocity corresponding to the remaining slewing angle to generate the slewing deceleration and adjusting the actual slewing angle velocity of the slewing structure, from the braking start timing; and correcting the target slewing angular velocity determined corresponding to the remaining slewing angle so as to increase the target slewing angular velocity, when an operation member provided in the slewing type working machine is operated to restart the slewing of the slewing structure toward the slewing stop angular position after the slewing structure has been stopped at a position before the slewing stop angular position, wherein the correction is performed by adding a predetermined correction amount to the target slewing angular velocity determined based on the remaining slewing angle.

6. The slewing stop control method of a slewing type working machine according to claim 5, wherein the calculated correction amount is an amount taking into account the remaining slewing angle and a velocity deviation which is a difference between the target slewing angular velocity determined based on the remaining slewing angle and the actual slewing angular velocity.

7. The slewing stop control method of a slewing type working machine according to claim 5, wherein the operation member is operated to designate the slewing direction and a target slewing angular velocity of the slewing structure when the slewing stop control of the slewing structure is not performed; and an operation satisfying a predetermined condition and performed on the operation member after a temporary stop of the slewing structure at a position before the slewing stop angular position is assumed to be an operation for restarting the rotation of the slewing structure toward the slewing stop angular position.

* * * * *